US009589398B2

(12) United States Patent
Kappeler et al.

(10) Patent No.: US 9,589,398 B2
(45) Date of Patent: *Mar. 7, 2017

(54) DISTRIBUTION OF PREMISES ACCESS INFORMATION

(71) Applicant: Inventio AG, Hergiswil NW (CH)

(72) Inventors: Markus Kappeler, Winterthur (CH); Paul Friedli, Remetschwill (CH)

(73) Assignee: Inventio AG, Hergiswil NW (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,665

(22) Filed: Oct. 27, 2015

(65) Prior Publication Data

US 2016/0049029 A1 Feb. 18, 2016

Related U.S. Application Data

(63) Continuation of application No. 13/433,161, filed on Mar. 28, 2012, now Pat. No. 9,202,322.

(30) Foreign Application Priority Data

Mar. 29, 2011 (EP) .................................... 11160153

(51) Int. Cl.
*G05B 19/00* (2006.01)
*G07C 9/00* (2006.01)

(52) U.S. Cl.
CPC ................................ *G07C 9/00031* (2013.01)

(58) Field of Classification Search
CPC .................................................. G07C 9/00031
USPC ........................................................ 340/5.61
See application file for complete search history.

(56) References Cited

U.S. PATENT DOCUMENTS

| | | | |
|---|---|---|---|
| 3,501,622 | A | 3/1970 | Chester et al. |
| 3,988,570 | A | 10/1976 | Murphy et al. |
| 5,514,857 | A | 5/1996 | Corless |
| 5,984,051 | A | 11/1999 | Morgan et al. |
| 6,141,758 | A | 10/2000 | Benantar et al. |
| 6,725,376 | B1 | 4/2004 | Sasmazel et al. |
| 6,760,841 | B1 | 7/2004 | Fernandez |
| 6,845,394 | B2 | 1/2005 | Ritche |
| 7,185,360 | B1 | 2/2007 | Anton et al. |
| 7,231,663 | B2 | 6/2007 | Medvinsky |
| 7,257,542 | B2 | 8/2007 | Goodwin |
| 7,262,736 | B2 | 8/2007 | Sunaga |

(Continued)

FOREIGN PATENT DOCUMENTS

| | | | |
|---|---|---|---|
| EP | 1 705 595 | A2 | 9/2006 |
| EP | 2 237 234 | A1 | 10/2010 |
| JP | 11227370 | A | 8/1999 |

OTHER PUBLICATIONS

European Search Report dated Jul. 25, 2011, issued in priority European Application No. 11160153.

*Primary Examiner* — Kerri McNally

(74) *Attorney, Agent, or Firm* — Stroock & Stroock & Lavan LLP

(57) ABSTRACT

Premises access information can be distributed using a system having a ticket server coupled to a remotely located premises server. The ticket server receives a ticket request from a host device. After interacting with the premises server, the ticket server sends access-related information to a visitor device. The visitor device can later use the access-related information to gain access to a premises.

20 Claims, 10 Drawing Sheets

(56) References Cited

U.S. PATENT DOCUMENTS 7,565,537 B2 7/2009 Morais et al.
7,610,220 B2 10/2009 Cella et al.
7,660,751 B2 2/2010 Cella et al.
7,660,752 B2 2/2010 Cella et al.
7,841,525 B1* 11/2010 Zhou .................... G06Q 20/045 235/382
7,922,081 B2 4/2011 Ito
7,974,926 B2 7/2011 Ohmori et al.
8,249,592 B1 8/2012 Nielsen et al.
8,707,457 B2 4/2014 Chinta
2001/0051915 A1 12/2001 Ueno et al.
2002/0157090 A1 10/2002 Anton
2002/0194319 A1 12/2002 Ritche
2002/0198976 A1 12/2002 Davenport
2003/0046367 A1 3/2003 Tanaka
2003/0061165 A1 3/2003 Okamoto et al.
2003/0066883 A1* 4/2003 Yu ........................ G06K 7/1095 235/382
2003/0163522 A1* 8/2003 Nakamura ............ H04L 63/104 709/203
2003/0183694 A1 10/2003 Sayers et al.
2003/0207708 A1 11/2003 Sadri et al.
2004/0044895 A1 3/2004 Reasons et al.
2004/0111373 A1 6/2004 Iga
2005/0246281 A1 11/2005 Gakuhari et al.
2006/0230438 A1 10/2006 Shappir et al.
2007/0082704 A1 4/2007 Nakano et al.
2007/0124802 A1 5/2007 Anton et al.
2007/0192255 A1 8/2007 Ohmori et al.
2007/0220598 A1 9/2007 Salowey et al.
2007/0226293 A1 9/2007 Sakurada et al.
2007/0226365 A1 9/2007 Hildreth et al.
2007/0241181 A1 10/2007 Ito
2007/0276944 A1 11/2007 Samovar et al.
2007/0299684 A1 12/2007 Goodwin
2008/0040222 A1 2/2008 Gee
2010/0090865 A1* 4/2010 Dasgupta ................. G08G 1/14 340/932.2
2010/0205555 A1 8/2010 Nielsen et al.
2012/0185394 A1 7/2012 Gelfand et al.
2012/0234906 A1* 9/2012 Ganapathi ............... G07F 17/24 235/375

* cited by examiner

DISTRIBUTION OF PREMISES ACCESS INFORMATION

CROSS-REFERENCE TO RELATED APPLICATION

This application is a continuation of U.S. patent application Ser. No. 13/433,161, filed Mar. 28, 2012, which claims foreign priority to European Patent Application No. 11160153.0, filed Mar. 29, 2011. The contents of both of these applications are incorporated herein by reference.

FIELD

This disclosure relates to the distribution of premises access information.

BACKGROUND

Access information can be used to determine who or what can enter a premises and, for example, under what circumstances. The premises can comprise, for example, one or more buildings, a portion of a building, an open or semi-open area, a subterranean structure and/or an elevator installation.

It is sometimes more convenient if premises access information can be distributed electronically (compared to, for example, distributing the access information exclusively by personal contact or by physical methods such as a delivery service). Accordingly, it can be useful to have additional technologies for electronic distribution of premises access information.

SUMMARY

Premises access information can be distributed using a ticket server coupled to a remotely located premises server. The ticket server receives a ticket request from a host device. After interacting with the premises server, the ticket server sends access-related information to a visitor device. The visitor device can later use the access-related information to gain access at a premises.

In some embodiments, a premises access control method comprises: receiving, from a host device and using a ticket server, an optical code access ticket request for use at a premises by a visitor device; sending, using the ticket server, an authorization request to a premises server, the ticket server being remotely located from the premises server and remotely located from the host device; and sending, using the ticket server an access link message to the visitor device, the access link message providing access to an optical code for accessing the premises. The access ticket request can comprise a time parameter, an entrance location parameter and a supplemental code parameter. The premises server can be located at the premises. The method can further comprise authenticating the host device, possibly for the premises. In further embodiments, the premises server is configured to provide access to the premises based on the optical code and based on a supplemental code from the premises server. The method can further comprise sending, using the premises server, the supplemental code to the visitor device. The premises can comprise a plurality of entrances, the method further comprising determining that the optical code for accessing the premises has been presented at an incorrect one of the plurality of entrances. The premises server can record visit information associated with the optical code.

In still further embodiments, the method comprises providing visitor guidance information to the visitor device based at least in part on the optical code, the guidance information possibly including an elevator call assignment. The method can further comprise sending, using the ticket server, the optical code to the visitor device. Access rights associated with the optical code can be modified. The ticket server and the premises server can be controlled by different parties.

Unless stated otherwise, the method acts disclosed herein can be performed by a processor executing instructions stored on one or more computer-readable storage media. The computer-readable storage media comprise, for example, one or more optical disks, volatile memory components (such as DRAM or SRAM), and/or nonvolatile memory components (such as hard drives, Flash RAM or ROM). The computer-readable storage media do not exclusively comprise transitory signals.

BRIEF DESCRIPTION OF THE DRAWINGS

Exemplary embodiments of the disclosed technologies are described below with reference to the following figures.

DETAILED DESCRIPTION

The term "host," as used herein, generally refers to a party that intends to have access to a premises granted to a person and/or to a machine. In various cases, the host is one or more persons, an organization or a machine (e.g., a computer or robot). The term "visitor," as used herein, generally refers to a party that receives or is intended to receive access to a premises. In various cases, the visitor is one or more persons, an organization or a machine (e.g., a computer or robot). The host and/or the visitor may or may not be an occupant of the premises. No particular level of familiarity with the premises is required of the visitor or the host.

Figure 1:
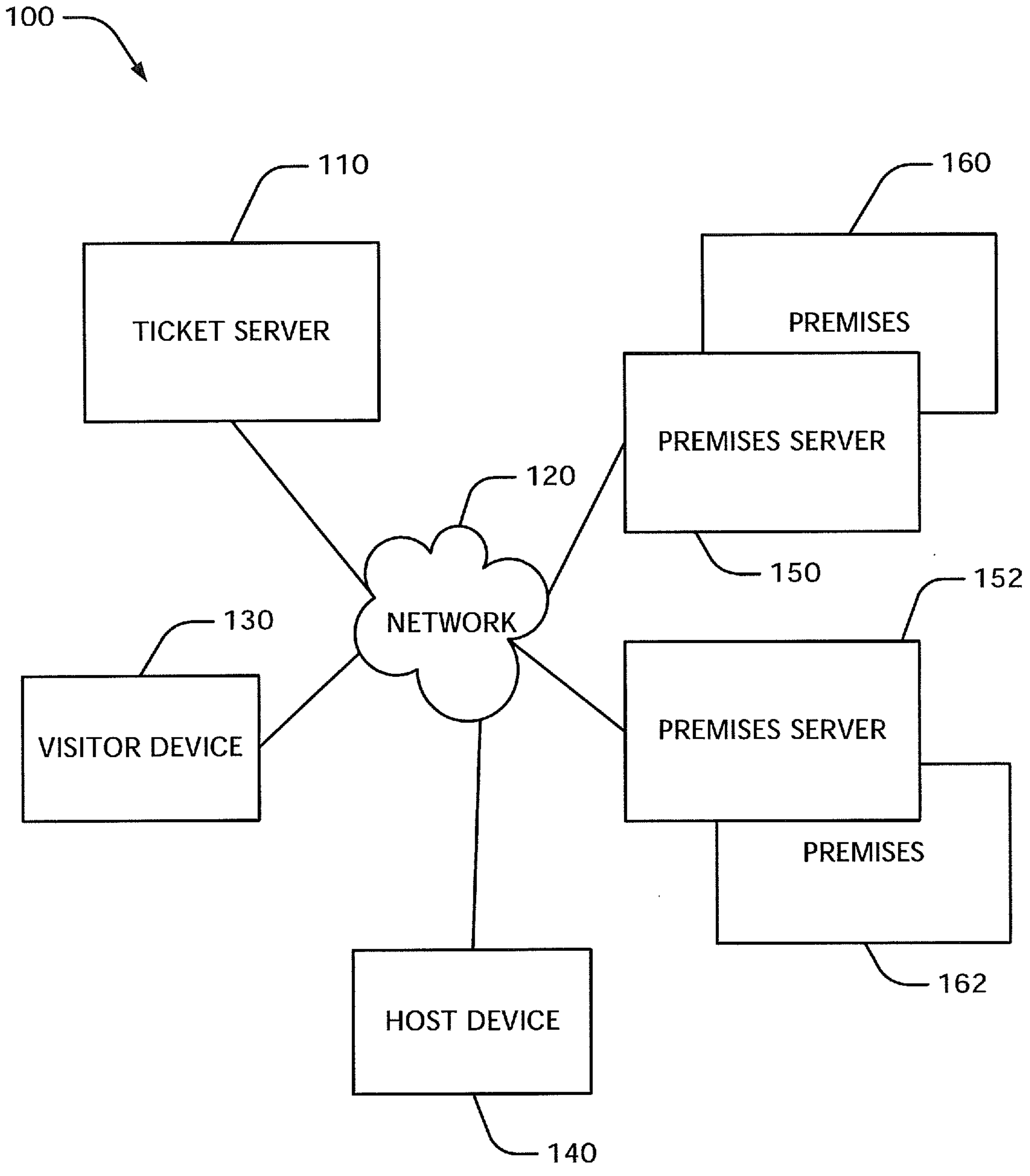
FIG. 1 shows a block diagram of an exemplary embodiment of a system for distribution of premises access information.

FIG. 1 shows a block diagram of an exemplary embodiment of a system 100 for distribution of premises access information. As used herein, "premises access information" generally refers to information that can be used to gain entrance to one or more portions of a premises. The system 100 comprises a ticket server 110, which can exchange information with one or more other system components through a network 120. The network 120 comprises a wired and/or wireless network (e.g., an Ethernet network, a wireless LAN network and/or the internet). In at least some cases, the ticket server is remotely located from the other system components. In at least some cases, communications over the network 120 are performed using various security measures. For example, data can be encrypted and/or a VPN (virtual private network) can be used.

Further components can include, for example, a visitor device 130 and a host device 140. Each of the visitor device 130 and the host device 140 can comprise a portable electronic device configurable to execute one or more software programs, including software programs which cause the devices 130, 140 to perform one or more method acts described herein. Examples of the devices 130, 140 include handheld computers, smartphones, mobile telephones, tablet computers, laptop computers and PDAs. The host device 140 can also comprise electronic devices which are not necessarily considered to be "portable," such as desktop personal computers. The devices 130, 140 can be the same model of device, or they can be different models.

The system 100 further comprises a premises server 150. The premises server 150 handles permission information for one or more premises 160. In some cases, the server 150 is located at the premises 160; in other cases, the server 150 is located outside of the premises 160. The system 100 can further comprise one or more additional premises servers 152, which can store permission information for one or more other premises 162.

Figure 2:
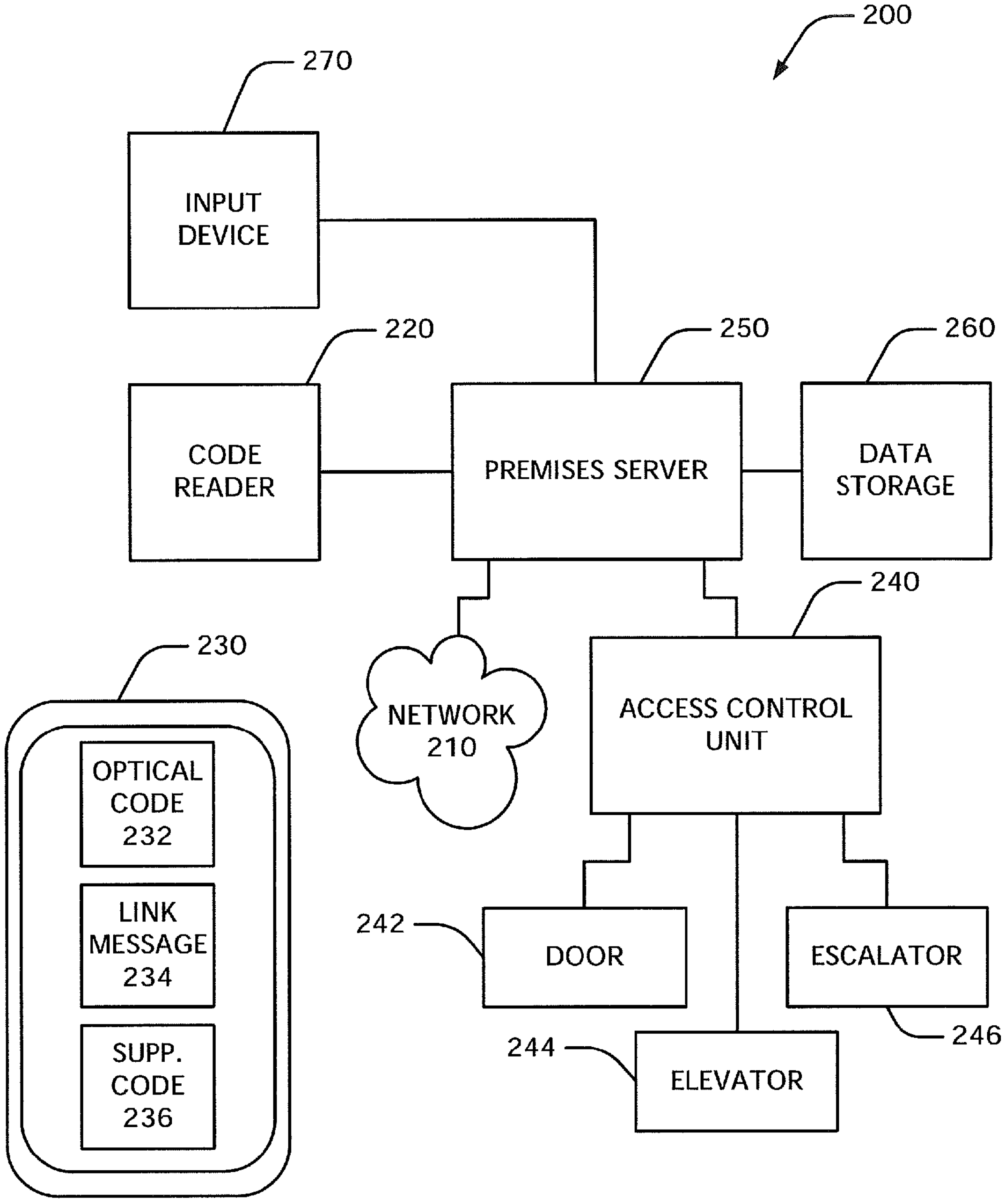
FIG. 2 shows a block diagram of an exemplary embodiment of system for controlling access to a premises.

FIG. 2 shows a block diagram of an exemplary embodiment of system 200 for controlling access to a premises. The system 200 comprises a premises server 250, which can be similar to the servers 150, 152 described above. Using a network 210, the server 250 can communicate with other components (e.g., one or more other components described above in the system 100). Using a data storage component 260, the server 250 can read and/or write permissions data (e.g., whether a visitor should be granted access to a premises at a particular time and place) and other data. The server 250 is coupled to one or more code readers 220, which are designed to read single- or multi-dimensional optical codes from hardcopy documents (e.g., paper printouts) and/or from portable electronic devices. For example, the reader 220 can read a two-dimensional optical code 232 that is displayed on the screen of a portable electronic device 230. In various embodiments, the optical code 232 comprises a bar code, a QR code, a DataMatrix code, and/or another type of code. The code reader 220 generally comprises a bar code scanner, a camera and/or other imaging device. As explained below, a link message 234 and/or a supplemental code message 236 can also be displayed and/or stored by the device 230. The optical code 232 stores information that allows a visitor to be associated with permissions data.

The server 250 can be coupled to an access control unit 240. The access control unit 240 provides operating signals to one or more components at the premises. Such components can include one or more doors 242, one or more elevators 244 and/or one or more escalators 246. In particular embodiments, the premises comprises multiple entrances, each of the entrances comprising a door, elevator and/or escalator. In some embodiments, the server 250 is also coupled to an input device 270. The input device 270 can comprise, for example, a keyboard or keypad, and can be used for entering additional information. Examples of such information are described below.

In at least some cases, the system 200 can generally be used as follows. A visitor having the portable electronic device 230 approaches the code reader 220 at a premises to which the visitor wishes to gain access. The code reader 220 reads the code 232 from the screen of the device 230 and sends the code to the premises server 250. The server 250 examines permission data stored in the data storage component 260 and determines whether the visitor should be granted access to the premises based on the visitor's possession of the code 232. If access is to be granted, the server 250 indicates this to the access control unit 240. The access control unit 240 then accordingly operates one or more components (e.g., door 242, elevator 244, escalator 246) to give the visitor the appropriate access to the premises.

Figure 3:
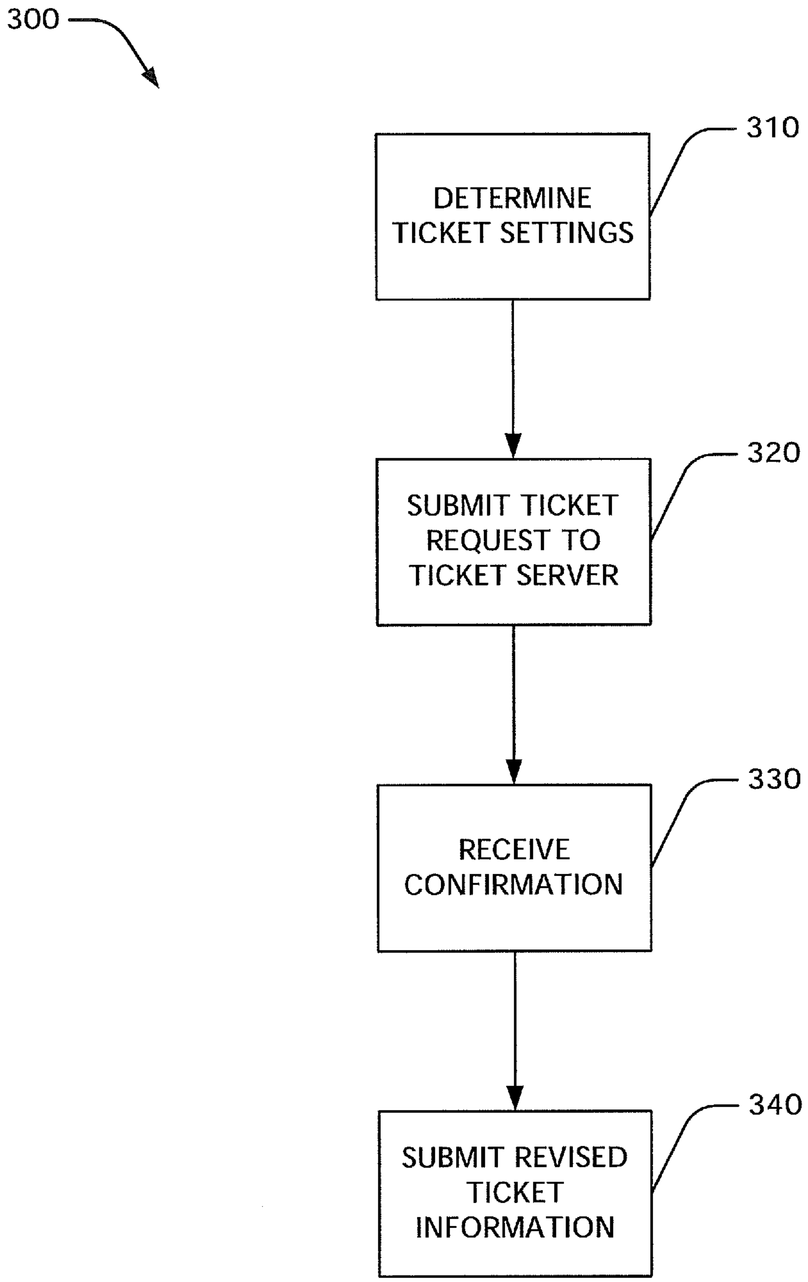
FIG. 3 shows a block diagram of an exemplary embodiment of a method for distributing premises access information.

FIG. 3 shows a block diagram of an exemplary embodiment of a method 300 for distributing premises access information. In a method act 310, a host indicates one or more ticket settings or parameters using a host device (e.g., similar to the host device 140, described above). The ticket settings can comprise, for example: an identifier for a visitor device (e.g., telephone number, IMEI (International Mobile Equipment Identity) number, MAC (media access control) address, serial number); a date and time for access (including a specific time or one or more time ranges); a premises identifier; an entrance identifier; how often a given optical code for the visitor device can be used (e.g., once or more than once); and/or an indication of whether additional information should be required for obtaining access at the premises. The additional information (also called "supplemental" information) can comprise, for example, a personal identification number (PIN) or other piece of information that can be presented in conjunction with an optical code.

In a method act 320, the ticket request is submitted to a ticket server. In some embodiments, if the request is approved, the host device receives a confirmation of the approval in a method act 330.

In further embodiments, information for a requested ticket can be revised in a method act 340. For example, the ticket can be canceled, or one or more of the ticket settings can be changed.

Figure 4:
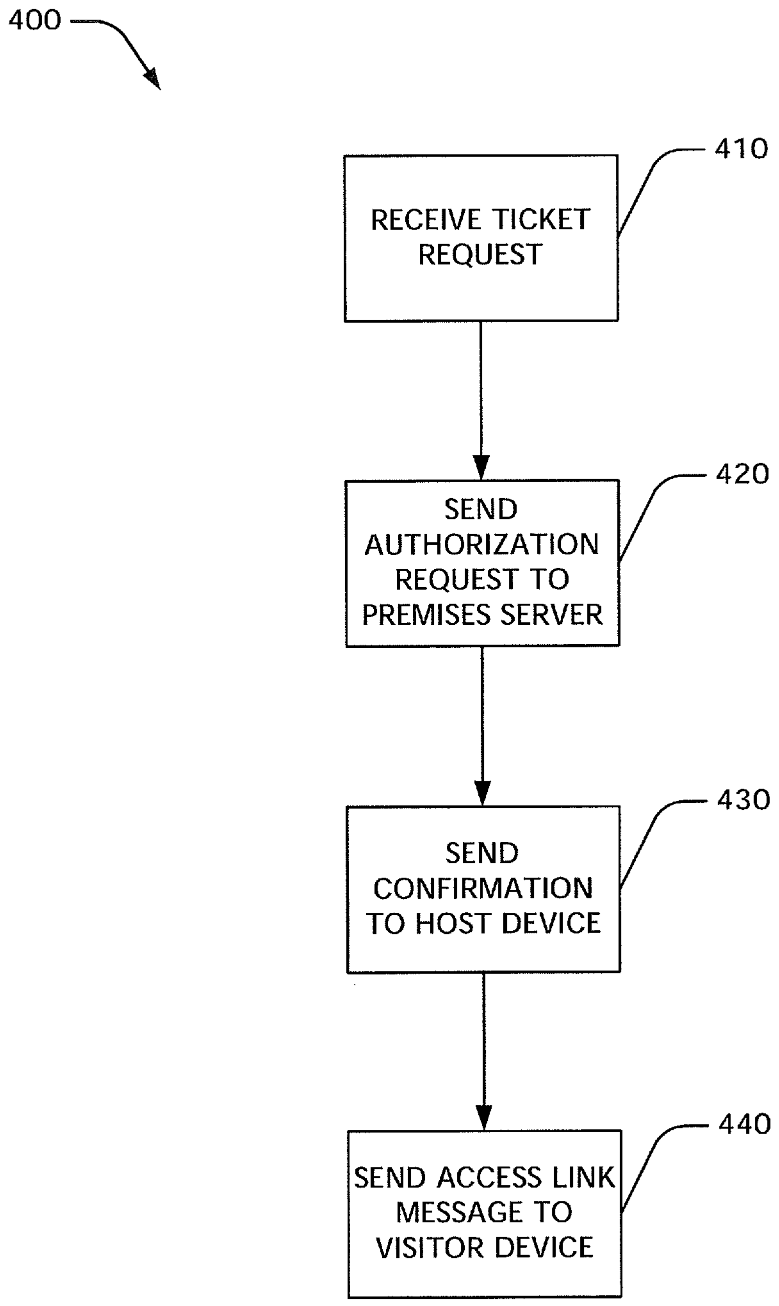
FIG. 4 shows a block diagram of an exemplary embodiment of a method for distributing premises access information.

FIG. 4 shows a block diagram of an exemplary embodiment of a method 400 for distributing premises access information. In a method act 410, a ticket server (e.g., like the server 110 described above) receives a ticket request from a host device. In further embodiments, the ticket server performs an authentication of the host device. The authentication can be based on, for example, X.509 protocol and/or another protocol.

Based at least in part on the ticket request, the ticket server sends an authorization request to a premises server (e.g., like the premises server 150 described above) in a method act 420. The authentication request includes, for example, identifying information for a visitor device and details of the location and time of the requested visit. In some cases the request also indicates whether supplemental information should be required for obtaining access at the premises. In additional cases the request includes identifying information for the visitor device (e.g., a telephone number and/or e-mail address). In some embodiments, if the request is approved by the premises server, the ticket server receives a confirmation from the premises server.

In further embodiments, in a method act 430, the ticket server sends the host device a confirmation that the ticket request has been approved. In still further embodiments, in a method act 440, the ticket server sends a link message to the visitor device. Generally, the link message provides information that allows the visitor device to request an optical code that can be used in obtaining access to the premises. One or more access rights are thus associated with the optical code. In some embodiments, the link message comprises a network address, such as a URL. At least a portion of the link message can be sent as an e-mail message, a text message, or a multimedia message. In some cases, the optical code is sent to the visitor device without first sending a link message to the visitor device.

Figure 5:
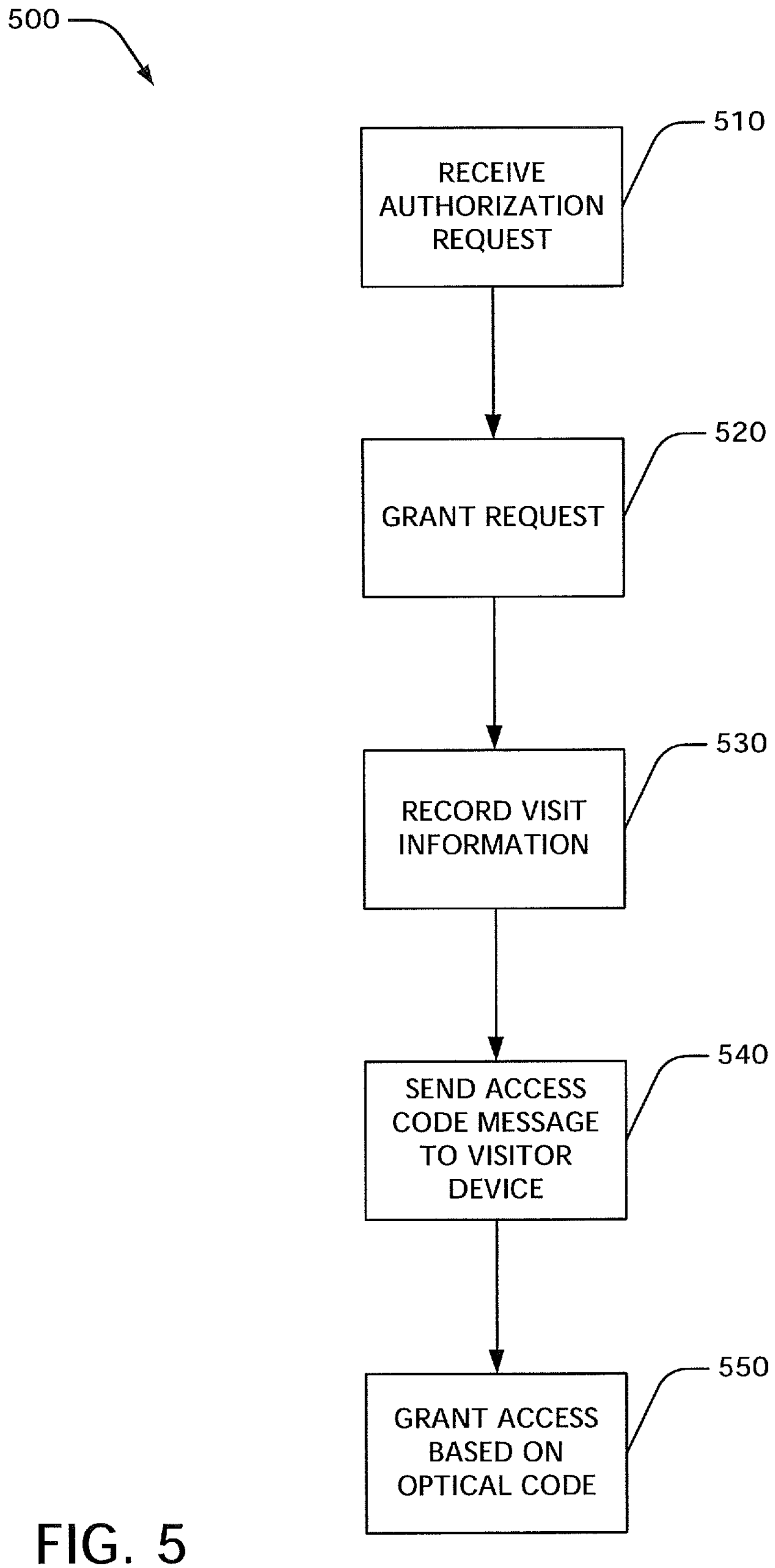
FIG. 5 shows a block diagram of an exemplary embodiment of a method for distributing premises access information.

FIG. 5 shows a block diagram of an exemplary embodiment of a method 500 for distributing premises access information. In a method act 510, a premises server (like the premises servers 150, 152, 250, described above) receives from a ticket server a request to authorize a ticket for a visitor device. The authorization request can be similar to the request described above for FIG. 4. The premises server compares the authorization request to permissions information (possibly stored in a device like the data storage component 260, described above). If the authorization request is allowable according to the permissions information, the premises server grants the request in a method act 520. Otherwise, the permissions server may deny the request.

For further embodiments, in a method act 530, the premises server records information about the request, such as the visit time and location, and whether additional information is required from the visitor.

In still further embodiments, if the premises server will require additional information (e.g., a supplemental code) from the visitor at the premises, the premises server sends this information to the visitor device in an access code message in a method act 540. At least a portion of the information can be sent as an e-mail message, a text message, or a multimedia message.

When the optical code (and, in some cases, the additional information) is presented to a code reader at the premises, the premises server grants access to the visitor in a method act 550, assuming that the conditions associated with the optical code are satisfied.

The option to require additional information from the visitor, and the option to have that information provided to the visitor by the premises server, can provide for more robust security than in a system where the additional information is not required or where both the access link message and the additional information are provided to the visitor device by the authorization server. For example, in some cases the authorization server and the premises server could be controlled by two different entities (e.g., a service provider and a building owner or manager, respectively). Accordingly, requiring a visitor to present both an optical code and, for example, a PIN to obtain access can help prevent the service provider from granting access to the premises without the permission or knowledge of the building owner or manager.

Figure 6:
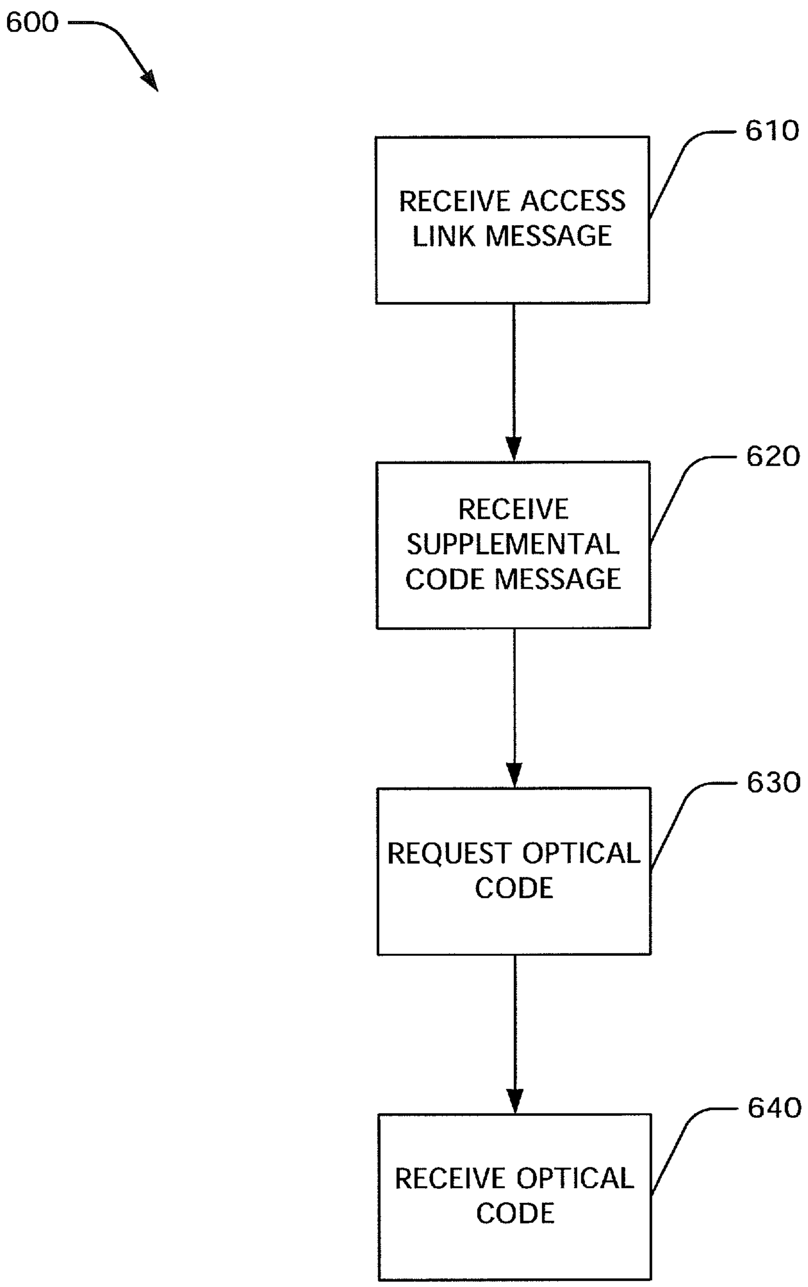
FIG. 6 shows a block diagram of an exemplary embodiment of a method for receiving premises access information.

FIG. 6 shows a block diagram of an exemplary embodiment of a method 600 for receiving premises access information. In a method act 610, a visitor device (like the visitor device 130, described above) receives an access message link. As was similarly explained above, the link message generally provides information that allows the visitor device to request an optical code that can be used in obtaining access to the premises. In some embodiments, in a method act 620 the visitor device receives a message containing a supplemental code. In particular embodiments, method act 620 can occur before act 610.

In a method act 630, the visitor device, based at least in part on the access link message, requests an optical code from a ticket server. In a method act 640, the visitor device receives the optical code. The optical code can then be used to gain access to the premises. In at least some cases, the code is valid for a limited time after it is requested (e.g., one, five or ten minutes, or another amount of time). This can help prevent unauthorized use of the code if, for example, the visitor device is lost or stolen after the optical code is requested, but before it is presented at the premises.

Figure 7:
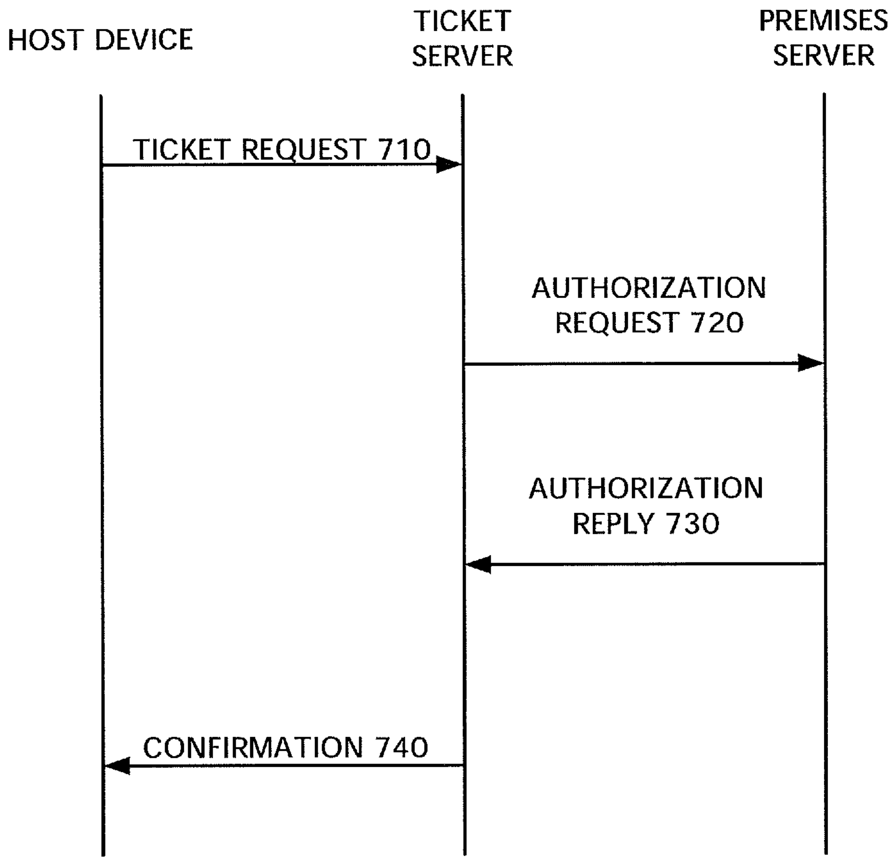
FIG. 7 shows a signal diagram for an exemplary exchange of signals produced according to one or more embodiments of the disclosed technologies.

FIG. 7 shows a signal diagram for an exemplary exchange of signals produced according to one or more embodiments of the disclosed technologies. The participants in this exchange include, for example, a host device (like the host device 140, described above), a ticket server (like the ticket server 110, described above), and a premises server (like the premises server 152, described above). The host device sends a ticket request 710 to the ticket server. The ticket server sends an authorization request 720 to the premises server. The premises server sends an authorization reply 730 to the ticket server. In some cases, the ticket server sends a confirmation 740 of the authorization of the ticket request to the host device.

Figure 8:
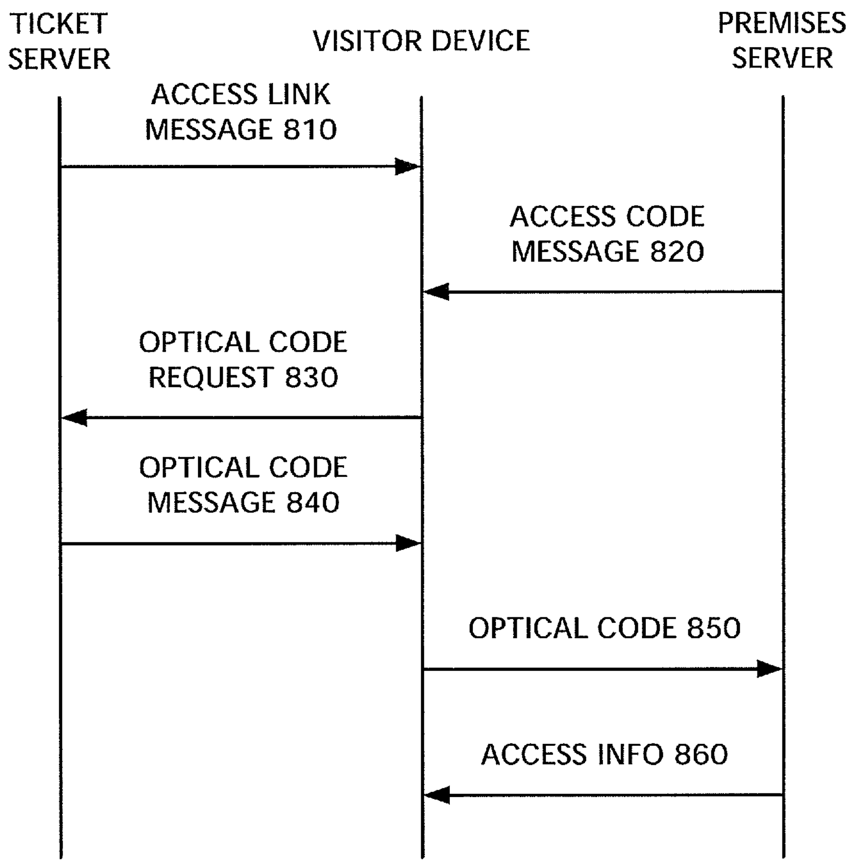
FIG. 8 shows a signal diagram for an exemplary exchange of signals produced according to one or more embodiments of the disclosed technologies.

FIG. 8 shows a signal diagram for an exemplary exchange of signals produced according to one or more embodiments of the disclosed technologies. The participants in this exchange include, for example, a ticket server (like the ticket server 110, described above), a visitor device (like the visitor device 130, described above), and a premises server (like the premises server 152, described above). The ticket server sends an access link message 810 to the visitor device. The premises server sends an access code message 820 to the visitor device. The visitor device sends to the ticket server an optical code request 830. The ticket server in reply sends an optical code message 840 to the visitor device.

The visitor device then provides a message 850 with the optical code to the premises server through, for example, a code reader. Although not depicted in FIG. 8, in some embodiments the visitor also provides to the premises server additional information, such as a PIN code. In some cases the additional information can be transmitted from the visitor device to the premises server. In other cases, the additional information is provided by the visitor through an input device, such as a keypad or keyboard. In some embodiments, the premises server then sends a message 860 to the visitor device with access information. The access information can comprise, for example, a confirmation that access has been granted, a direction in which the visitor should travel, a distance which the visitor should travel, a door that the visitor should enter, an escalator that the visitor should take, and/or a call assignment for an elevator.

Generally, FIGS. 7 and 8 can be read such that signals appearing toward the bottom of the figure are sent after those appearing toward the top of the figure. However, in some embodiments of the disclosed technologies, other orders for sending signals are possible. For example, in FIG. 8, the access code message 820 can be sent to the visitor device before the access link message 810.

Figure 9:
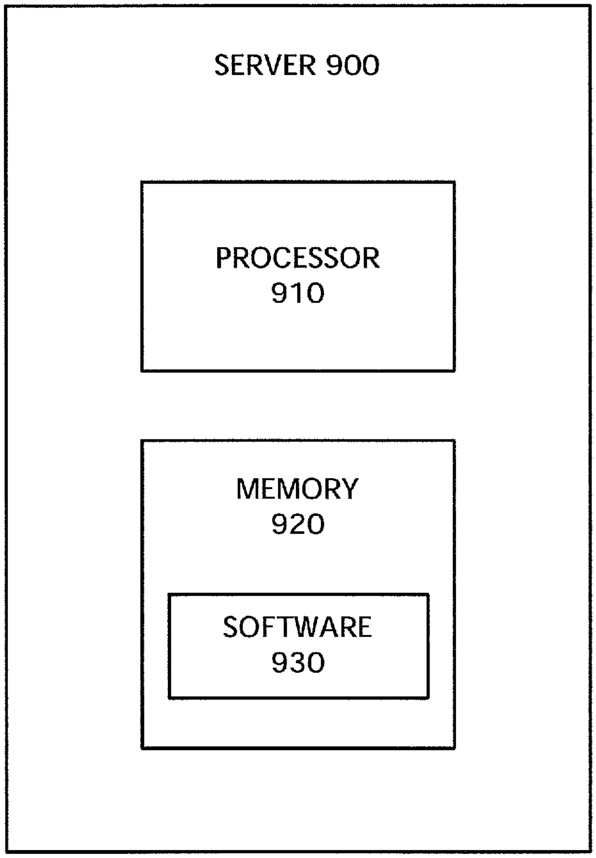
FIG. 9 shows a block diagram of an exemplary embodiment of a server that can be used with one or more technologies disclosed herein.

FIG. 9 shows a block diagram of an exemplary embodiment of a server 900 (e.g., a ticket server, a premises server) that can be used with one or more technologies disclosed herein. The server comprises one or more processors 910. The processor 910 is coupled to a memory 920, which comprises one or more computer-readable storage media storing software instructions 930. When executed by the processor 910, the software instructions 930 cause the processor 910 to perform one or more method acts disclosed herein. Further embodiments of the server 900 can comprise one or more additional components.

Figure 10:
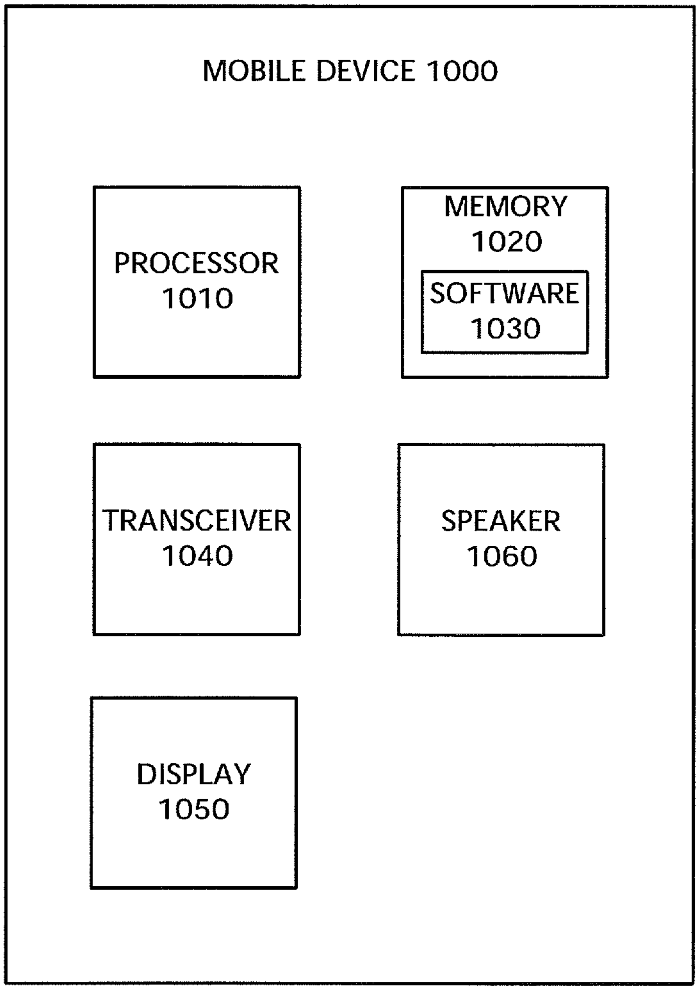
FIG. 10 shows a block diagram of an exemplary embodiment of an electronic device that can be used with one or more technologies disclosed herein.

FIG. 10 shows a block diagram of an exemplary embodiment of an electronic device 1000 that can be used with one or more technologies disclosed herein, for example as a visitor device and/or a host device. The device 1000 comprises components such as a processor 1010. The processor 1010 is coupled to a memory 1020, which comprises one or more computer-readable storage media storing at least software instructions 1030. When executed by the processor 1010, the software instructions 1030 cause the processor 1010 to perform one or more method acts disclosed herein. The software instructions 1030 can be loaded onto the device 1000 through a connection with another electronic device (e.g., a personal computer), through a connection to one or more computer-readable storage media (e.g., through a data storage card) and/or through a network connection (e.g., over the internet or a private network).

The device 1000 further comprises one or more input and/or output devices, such as a display 1050 (possibly a touch-sensitive display) and an audio speaker 1060. A transceiver 1040 allows the device 1000 to send and receive information with one or more networks (e.g., wireless networks, wired networks). The one or more networks can use various technologies, for example, wireless LAN, Bluetooth, UMTS, GSM, and/or others.

Various embodiments of the mobile device 1000 can omit one or more of the components shown in FIG. 10 and/or include additional components, including one or more further instances of any of the above components.

In one non-limiting example scenario showing use of embodiments of one or more of the above technologies, a worker at an office building uses a web-based interface and his desktop computer to place a ticket order with a ticket server. The worker informs the ticket server that he would like a guest to be able to access the office building through the main door next Tuesday between 10:00 and 10:15 AM, and that a PIN should be required to gain access. The worker also provides the guest's telephone number. The ticket server receives this request and (after authenticating the worker's computer) sends an authorization request to the appropriate premises server. The premises server, which is located at the office building, approves the request and records the visit information in a database. The ticket server sends a message to the worker's computer indicating that the request has been approved.

The guest receives a link message on her mobile telephone indicating the time and place of her scheduled visit, along with a URL link to a QR code for accessing the office building. The guest also receives an SMS message from the premises server containing a PIN for accessing the building.

When the guest arrives at the building for her appointment, she uses her mobile telephone to open the link in the link message. As a result, the ticket server sends an image of the QR code to be used for accessing the building. The guest mistakenly approaches a side door of the building and uses a code reader at that door to scan the QR code, which is displayed on the screen of her telephone. A display at the side door informs her that she is attempting to enter at the incorrect door, since her visit is scheduled to occur through the main door. The display at the side door provides the guest with directions to the correct door.

At the main door, the guest scans the QR code again, this time with a code reader at that door. The premises server recognizes the QR code and prompts the guest to input the corresponding PIN using a nearby keypad. Upon entering the required information, the main door opens for the guest. A display also indicates to the guest that the elevator destination call control system has assigned elevator B to bring her to her destination. The guest enters elevator B.

At this time, the worker receives an SMS or e-mail message indicating that his guest has arrived. The message also indicates that the guest is being brought to the worker's floor using elevator B. This allows the worker to go to the proper elevator to greet the guest.

As seen in this example, at least some of the disclosed technologies allow for easy electronic distribution of premises access information and guidance of a visitor. The worker also knew promptly of his guest's arrival.

Having illustrated and described the principles of the disclosed technologies, it will be apparent to those skilled in the art that the disclosed embodiments can be modified in arrangement and detail without departing from such principles. It should be understood that features described for one or more embodiments are also intended to be used with one or more other embodiments described herein, unless explicitly stated otherwise. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims. We therefore claim as our invention all that comes within the claims.

We claim:

1. A premises access control method, comprising:

receiving, from a host device and using a ticket server, a request for an optical code access ticket for use at a premises by a visitor device separate from the host device;

sending, using the ticket server, an authorization request to a premises server, the ticket server being remotely located from the premises server and remotely located from the host device;

receiving, from the premises server and using the ticket server, a confirmation that the authorization request is approved; and sending, using the ticket server, a message to the host device indicating that the request is approved, and an access link message to the visitor device, the access link message providing access to an optical code for accessing the premises.

2. The premises access control method of claim 1, the access ticket request comprising a time parameter, an entrance location parameter and a supplemental code parameter.

3. The premises access control method of claim 1, the premises server being located at the premises.

4. The premises access control method of claim 1, further comprising authenticating the host device.

5. The premises access control method of claim 4, the host device being authenticated for the premises.

6. The premises access control method of claim 1, the host device being a first host device, the request for the optical code access ticket being a request for a first optical code access ticket, the premises being a first premises, the visitor device being a first visitor device, the authorization request being a first authorization request, the premises server being a first premises server, the method further comprising:

receiving, from a second host device and using the ticket server, a request for a second optical code access ticket for use at a second premises by a second visitor device;

sending, using the ticket server, a second authorization request to a second premises server located at the second premises, the ticket server being remotely located from the second premises server and remotely located from the second host device; and sending, using the ticket server, a second access link message to the second visitor device, the second access link message providing access to a second optical code for accessing the second premises.

7. The premises access control method of claim 1, the premises server being programmed to provide access to the premises based on the optical code and based on a supplemental code from the premises server.

8. The premises access control method of claim 7, further comprising sending, using the premises server, the supplemental code to the visitor device.

9. The premises access control method of claim 1, the premises comprising a plurality of entrances, the method further comprising determining that the optical code for accessing the premises has been presented at an incorrect one of the plurality of entrances.

10. The premises access control method of claim 1, further comprising recording, using the premises server, visit information associated with the optical code.

11. The premises access control method of claim 1, further comprising providing visitor guidance information to the visitor device based at least in part on the optical code.

12. The premises access control method of claim 11, the visitor guidance information comprising an elevator call assignment.

13. The premises access control method of claim 1, further comprising sending, using the ticket server, the optical code to the visitor device.

14. The premises access control method of claim 1, further comprising modifying one or more access rights associated with the optical code.

15. The premises access control method of claim 1, the ticket server and the premises server being controlled by different parties.

16. A premises access control system, comprising:

a ticket server; and a premises server for a premises, the premises server being remotely located from the ticket server and connected to the ticket server over a network, the ticket server being programmed to:

receive, from a host device, a request for an optical code access ticket for use at the premises by a visitor device separate from the host device, send an authorization request to the premises server, receive, from the premises server, a confirmation that the authorization request is approved, and send a message to the host device indicating that the request is approved, and an access link message to the visitor device, the access link message providing access to an optical code for accessing the premises.

17. The premises access control system of claim 16, the premises server being a first premises server, the premises being a first premises and the network being a first network, the system further comprising a second premises server for a second premises, the second premises server being remotely located from the ticket server and connected to the ticket server over a second network.

18. One or more non-transitory computer-readable storage media having encoded thereon instructions which, when executed by a computer, cause the computer to perform a method, the method comprising:

receiving, from a host device and using a ticket server, a request for an optical code access ticket for use at a premises by a visitor device separate from the host device;

sending, using the ticket server, an authorization request to a premises server, the ticket server being remotely located from the premises server and remotely located from the host device;

receiving, from the premises server and using the ticket server, a confirmation that the authorization request is approved; and sending, using the ticket server, a message to the host device indicating that the request is approved, and an access link message to the visitor device, the access link message providing access to an optical code for accessing the premises.

19. One or more non-transitory computer-readable storage media having encoded thereon instructions which, when executed by a computer, cause the computer to perform a method, the method comprising:

receiving by a premises server, from a ticket server and using a premises server, a request to authorize a ticket for a visit at a premises by a visitor device, the ticket server being remotely located from the premises server;

sending by the premises server, to the ticket server, an authorization for the request;

storing by the premises server, information about the visit in a database;

receiving by the premises server, from the visitor device, a code corresponding to the authorization; and determining by the premises server, authorization for the visit according to the code and the information.

20. The non-transitory computer-readable storage media of claim 19 wherein the method further comprises sending, using the premises server, a supplemental code to the visitor device.

* * * * *